US012570216B2

(12) United States Patent (10) Patent No.: US 12,570,216 B2
Mori (45) Date of Patent: Mar. 10, 2026

(54) VEHICLE INTERIOR STRUCTURE

(71) Applicants:TOYOTA JIDOSHA KABUSHIKI KAISHA, Toyota (JP); TOYOTA BOSHOKU KABUSHIKI KAISHA, Kariya (JP)

(72) Inventor: Hisaya Mori, Toyota (JP)

(73) Assignees: TOYOTA JIDOSHA KABUSHIKI KAISHA, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 349 days.

(21) Appl. No.: 18/219,155

(22) Filed: Jul. 7, 2023

(65) Prior Publication Data

US 2024/0198911 A1 Jun. 20, 2024

(30) Foreign Application Priority Data

Jul. 15, 2022 (JP) ................................. 2022-114404

(51) Int. Cl.
B60R 5/04 (2006.01)
B60P 7/08 (2006.01)
B60R 7/08 (2006.01)
B62D 25/20 (2006.01)

(52) U.S. Cl.
CPC .................. B60R 5/04 (2013.01); B60P 7/08 (2013.01); B60R 7/08 (2013.01); B62D 25/20 (2013.01)

(58) Field of Classification Search
CPC . B60P 7/08; B60P 7/0807; B60R 5/04; B60R 7/08; B60R 13/02; B60R 13/0237; B62D 25/2036; B62D 25/2054
USPC ......................... 296/24.44, 37.1, 37.8, 37.13
See application file for complete search history.

(56) References Cited

U.S. PATENT DOCUMENTS

| | | | | |
|---|---|---|---|---|
| 8,505,794 B2 * | 8/2013 | Ardigo | ...................... | B60R 7/08 224/543 |
| 10,137,846 B2 * | 11/2018 | Shen | .................... | B60R 13/0212 |
| 10,557,275 B2 * | 2/2020 | Lescord | .................... | E04G 1/36 |
| 11,964,632 B2 * | 4/2024 | Rutman | ................ | B60P 7/0815 |
| 12,221,071 B2 * | 2/2025 | Levine | .................... | B60R 9/065 |
| 2023/0116745 A1 * | 4/2023 | Salter | ........................ | B60P 7/10 248/542 |

FOREIGN PATENT DOCUMENTS

| | | |
|---|---|---|
| JP | 2021-094987 A | 6/2021 |
| JP | 2021-172120 A | 11/2021 |
| JP | 2022-070304 A | 5/2022 |

* cited by examiner

*Primary Examiner* — Jason S Daniels
(74) *Attorney, Agent, or Firm* — Dinsmore & Shohl LLP

(57) ABSTRACT

A vehicle interior structure, includes: a first fixing part provided, at a fixed interval, at at least one of a side part extending in a vehicle front-rear direction of a vehicle cabin or a floor part extending in the vehicle front-rear direction of the vehicle cabin; and a module that is attachable and detachable relative to the first fixing part, the module having a removal direction that is orthogonal to the vehicle front-rear direction, and in-plane with the floor part or the side part.

4 Claims, 6 Drawing Sheets

VEHICLE INTERIOR STRUCTURE

CROSS-REFERENCE TO RELATED APPLICATION

This application is based on and claims priority under 35 USC 119 from Japanese Patent Application No. 2022-114404 filed on Jul. 15, 2022, the disclosure of which is incorporated by reference herein.

BACKGROUND

Technical Field

The present disclosure relates to a vehicle interior structure.

Related Art

A vehicle interior structure including a module that is detachable from a vehicle cabin is known (see, for example. Japanese Patent Application Laid-open No. 2022-70304).

Japanese Patent Application Laid-open No. 2022-70304 discloses a deck board in which plural cross grooves are formed and at which a package can be fixed by combining plural partition bodies that are fittable in the cross grooves.

Modules that are attachable/detachable relative to the vehicle cabin require that the modules installed in the vehicle cabin are not displaced during travel of the vehicle or during loading of a package. In contrast, the technology described in Japanese Patent Application Laid-open No. 2022-70304 inserts a partition body into a cross groove from a vehicle upper side and attaches the partition body to the deck board, and there is room for improvement in preventing positional deviation of the partition body.

SUMMARY

The present disclosure provides a vehicle interior structure capable of suppressing positional deviation of a module relative to a vehicle.

A vehicle interior structure according to a first aspect of the present disclosure includes a first fixing part provided, at a fixed interval, at at least one of a side part extending in a vehicle front-rear direction of a vehicle cabin or a floor part extending in the vehicle front-rear direction of the vehicle cabin; and a module that is be attachable and detachable relative to the first fixing part, the module having a removal direction that is orthogonal to the vehicle front-rear direction, and in-plane with the floor part or the side part.

According to the vehicle interior structure of the first aspect of the present disclosure, the removal direction is a direction orthogonal to the vehicle front-rear direction, and is in-plane with the floor part or the side part, which enables the removal direction of the module to be a direction orthogonal to the vehicle front-rear direction. Accordingly, the direction in which the module is removed is a direction orthogonal to the direction in which an inertial force acts on the module during travel of the vehicle. The removal direction of the module is also a direction orthogonal to a take-out direction of packages. As a result, positional deviation of the module with respect to the vehicle can be suppressed during travel of the vehicle and during loading of packages.

A vehicle interior structure according to a second aspect of the present disclosure is the vehicle interior structure of the first aspect of the present disclosure in which the floor part includes a step part formed by a first floor part and a second floor part formed at a higher position than the first floor part, and at least one of the modules is configured to have a same height as the step part.

According to the vehicle interior structure of the second aspect of the present disclosure, at least one module is configured with the same height as the step part, so that when the module is installed on the first floor part, the upper surface of the module is at the same height as the second floor part. This enables a flat surface to be formed between the module and the second floor part.

A vehicle interior structure according to a third aspect of the present disclosure is the vehicle interior structure of the first aspect or the second aspect of the present disclosure in which the module is formed in a tubular shape that is open at both ends.

According to the vehicle interior structure of the third aspect of the present disclosure, the modules are formed in a tubular shape with both side faces opened, so that when the modules are installed in a row in the vehicle front-rear direction so as to link the openings, a tunnel extending in the vehicle front-rear direction is formed. This enables packages to be placed on the upper surface of the module and also enables elongated packages to be stored in the tunnel.

A vehicle interior structure according to a fourth aspect of the present disclosure is the vehicle interior structure of any one of the first aspect to the third aspect of the present disclosure in which the module includes a second fixing part, which is configured to be fixed to the first fixing part provided at the at least one of the side part or the floor part and which is formed at a bottom plate of the module, and a third fixing part, which is formed at a top plate of the module and which is substantially the same as the first fixing part.

According to the vehicle interior structure of the fourth aspect of the present disclosure, a second fixing part is formed in a bottom plate of the module, and the third fixing part is formed in a top plate of the module, which enables the second fixing part of another module to be attached to the third fixing part at the top plate of the module. This enables the modules to be installed in a stacked configuration. As a result, plural modules can be combined in a free layout.

The present disclosure enables positional deviation of the module with respect to the vehicle to be suppressed.

BRIEF DESCRIPTION OF THE DRAWINGS

Exemplary embodiments of the present disclosure will be described in detail based on the following figures, wherein.

DETAILED DESCRIPTION

Figure 1:
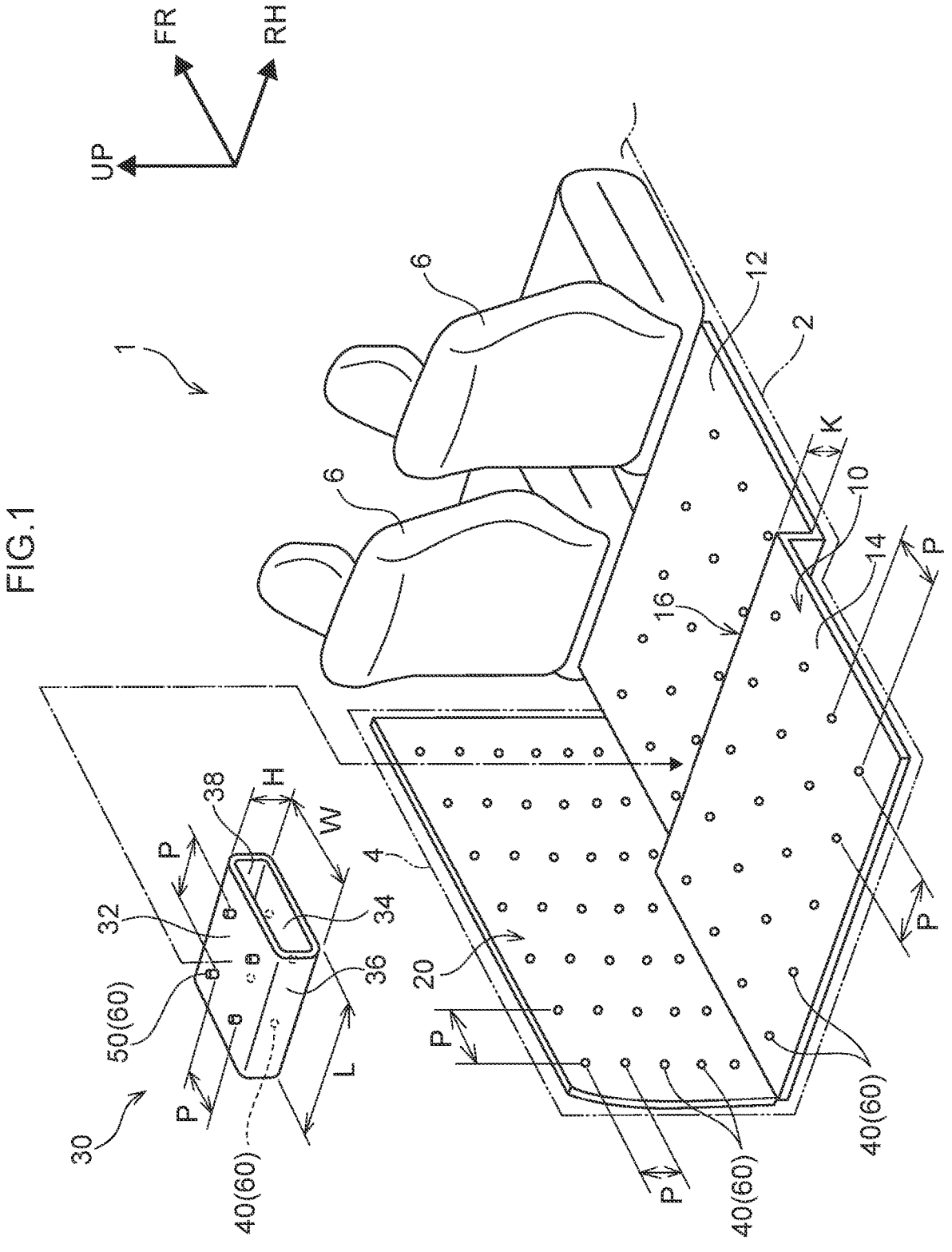
FIG. 1 is an exploded perspective view illustrating a vehicle interior structure according to the present exemplary embodiment, as viewed obliquely from rearward of the vehicle.

Explanation follows regarding a vehicle interior structure according to the present exemplary embodiment, with reference to the drawings. In the present exemplary embodiment, explanation follows regarding a vehicle interior structure of a wagon type vehicle. Note that the arrow UP illustrated in the drawings indicates an upper side of the vehicle, the arrow FR indicates a front side of the vehicle, and the arrow RH indicates a right side of the vehicle.
Configuration of Present Exemplary Embodiment As illustrated in FIG. 1, the vehicle 1 includes a floor panel 2 extending in a vehicle front-rear direction, and a side panel 4 extending in the vehicle front-rear direction.
Floor Section 10

The floor panel 2 is provided with the vehicle seat 6 and a floor section 10 disposed rearward of the vehicle seat 6.

The floor section 10 is, for example, resin, and is formed in a plate shape extending in the vehicle front-rear direction. The floor section 10 is disposed with a thickness direction as a vehicle vertical direction. The floor section 10 includes a first floor section 12 and a second floor section 14.

The first floor section 12 is disposed rearward of the vehicle seat 6. The first floor section 12 is provided over the entire region of the vehicle cabin in the vehicle width direction.

The second floor section 14 is disposed rearward of the first floor section 12 in the vehicle. The second floor section 14 is provided over the entire region of the vehicle cabin in the vehicle width direction. The second floor section 14 is formed at a higher position than the first floor section 12.

A step section 16 is formed in the floor section 10 by the first floor section 12 and the second floor section 14. The step section 16 has a height K.

The first floor section 12 and the second floor section 14 are provided with fixing sections 40 of the fasteners 60 arranged at regular intervals. The fixing sections 40 provided on the first floor section 12 and the second floor section 14 are disposed at a regular interval P in the vehicle width direction and in the vehicle front-rear direction.
Side Section 20

The side panel 4 is provided with a side section 20. The side section 20 is, for example, resin, and is formed in a plate shape extending in the vehicle front-rear direction. The side section 20 is disposed with a thickness direction in the vehicle width direction.

The side section 20 are provided with fixing sections 40 of the fasteners 60 arranged at regular intervals. The fixing sections 40 are disposed at a regular interval P in the vehicle vertical direction and in the vehicle front-rear direction.
Module The module 30 is formed in a rectangular cylindrical shape by the top plate 34, the bottom plate 32, and the side walls 36, 38. The module 30 is formed in a tubular shape with both ends in a longitudinal direction opened.

The module 30 is formed with a length L (e.g., 420 mm) in a longitudinal direction, a width W (e.g., 400 mm) in a transverse direction, and a height H. The height H of the module 30 is set equal to the height K of the step section 16.

Four fixing sections 50 of the fasteners 60 are provided on the bottom plate 32. The fixing sections 50 are arranged at an interval P in the longitudinal direction and the transverse direction. Four fixing sections 40 of the fastener 60 are provided on the top plate 34. The fixing sections 40 are disposed at an interval P in the longitudinal direction and the transverse direction.
Fastener 60

Figure 2:
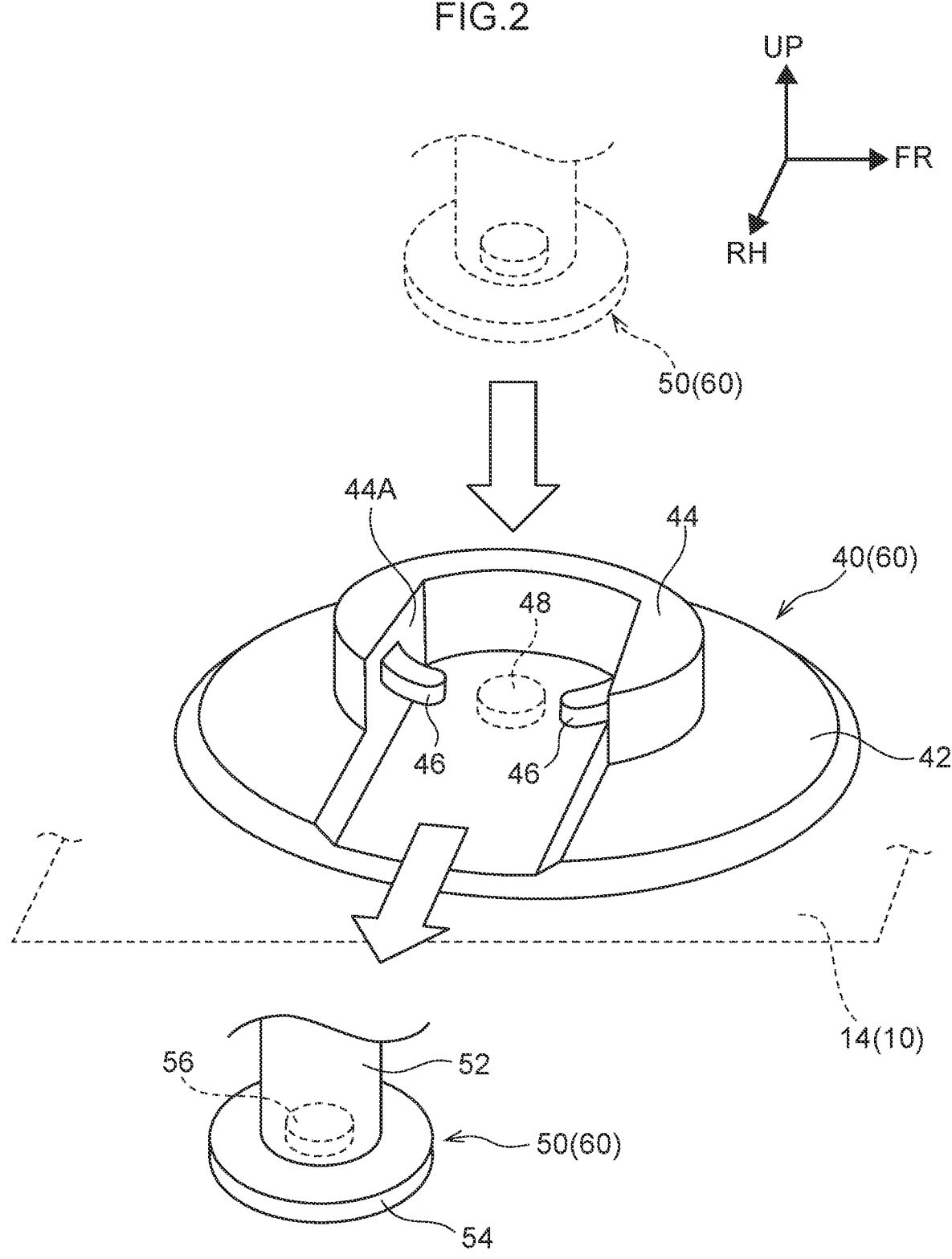
FIG. 2 is an exploded perspective view illustrating a fastener according to the present exemplary embodiment.

As illustrated in FIG. 2, the fastener 60 includes the fixing section 50, and the fixing section 40, to and from which the fixing section 50 is attachable and detachable. Note that explanation follows regarding the fixing section 40 attached to the floor section 10.

The fixing section 50 includes a cylindrical base section 52 and a flange 54 provided at a leading end of the base section 52. The flange 54 is formed in a disk shape with a larger diameter than the base section 52. A magnet 56 is attached to the flange 54.

The fixing section 40 includes a disc-shaped base section 42 and a convex section 44 protruding from an upper surface of the base section 42 to an upper side of the vehicle. The convex section 44 is formed in a cylindrical shape with a smaller diameter than the base section 42. The convex section 44 is provided with a substantially U-shaped cut-out section 44A that opens to the right side of the vehicle.

The cut-out section 44 A includes lock sections 46 provided so as to oppose at side walls of the cut-out section 44 A. The lock sections 46 are urged by an urging member (not illustrated) in a direction in which the lock sections 46 approach each other. A magnet 48 is attached to the base section 42.

In the fastener 60 configured in this manner, when the flange 54 of the fixing section 50 is inserted into the cut-out section 44A of the fixing section 40 from the upper side of the vehicle, owing to the attractive force of the magnet 56 of the fixing section 50 and the magnet 48 of the fixing section 40, the fixing section 50 is attached to the fixing section 40. At this time, the flange 54 is caught by the lock sections 46, and the fixing section 50 will not detach from the fixing section 40 to the vehicle upper side.

On the other hand, when the fixing section 50 attached to the fixing section 40 is moved rightward in the vehicle, the locking of the flange 54 by the lock sections 46 is released, and the fixing section 50 is detached from the fixing section 40.

In the floor section 10, the fixing section 40 is disposed so that the cut-out section 44A opens to the right side of the vehicle. In the side section 20, the fixing section 40 is disposed so that the cut-out section 44A opens to the upper side of the vehicle.

The direction in which the module 30 is attached to the floor section 10 is the vehicle vertical direction, and the direction in which the module 30 is detached from the floor section 10 is the vehicle width direction. The direction in which the module 30 is attached to the side section 20 is the vehicle width direction, and the direction in which the module 30 is detached from the side section 20 is the vehicle vertical direction.

In other words, the direction in which the module 30 is detached from the floor section 10 is a direction orthogonal to the vehicle front-rear direction and is in-plane with the floor section 10. The direction in which the module 30 is detached from the side section 20 is a direction orthogonal to the vehicle front-rear direction, and is in-plane with the side section 20.
Module 30 Attachment and Detachment Method
Method of Attaching the Module 30 to a Floor Section As illustrated in FIG. 1, when attaching the module 30 to the floor section 10, the module 30 is moved from the vehicle upper side of the floor section 10 to a vehicle lower side, and attached to the floor section 10. At this time, the fixing section 50 attached to the module 30 is fixed to the fixing section 40 attached to the floor section 10.

Method of Detaching Module 30 from Floor Section

Figure 3:
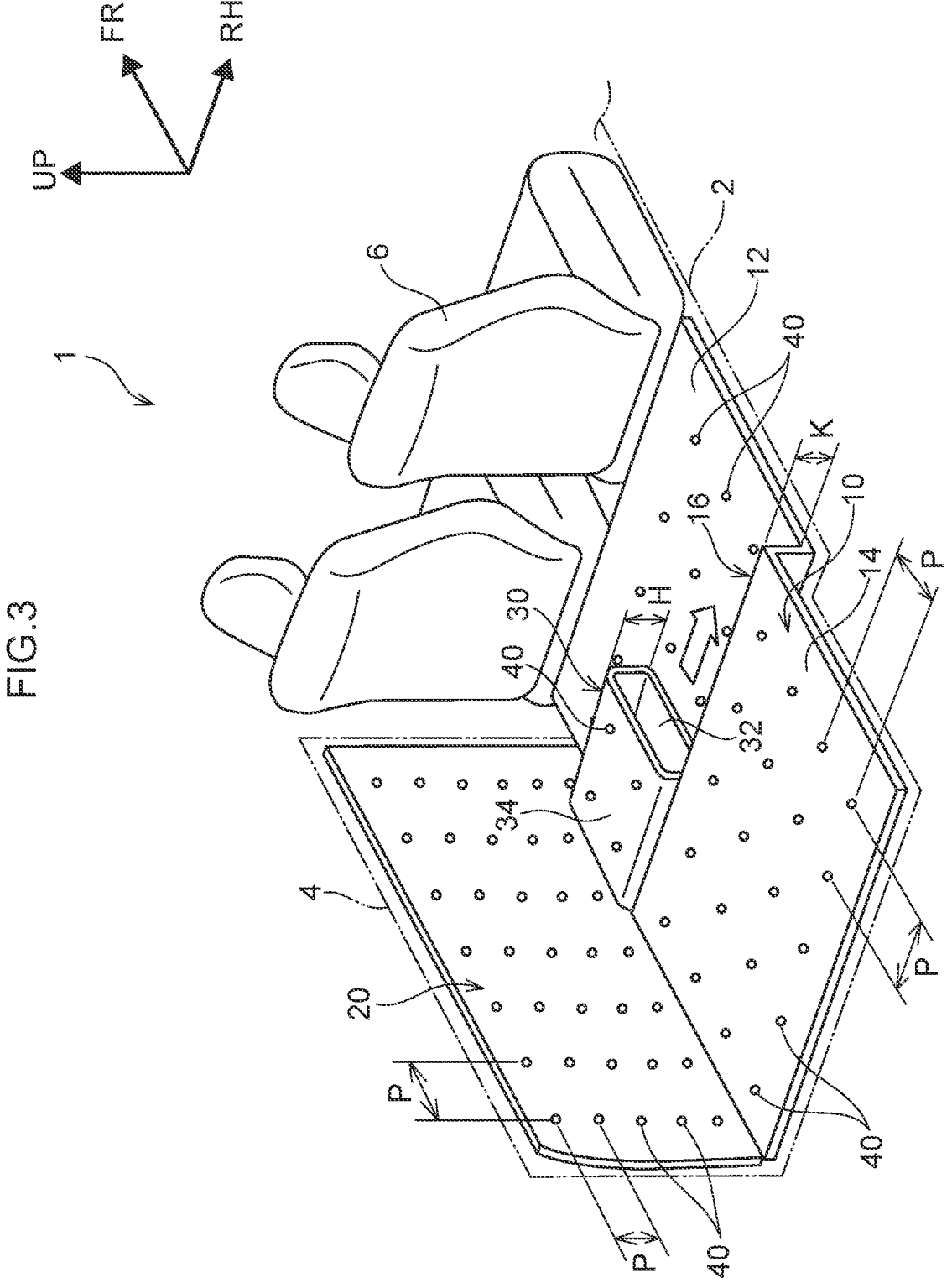
FIG. 3 is a perspective view illustrating an example of a vehicle interior structure according to the present exemplary embodiment, as viewed obliquely from rearward of the vehicle.

As illustrated in FIG. 3, when the module 30 is detached from the floor section 10, the module 30 is moved to the right of the vehicle and detached from the floor section 10. At this time, the fixing section 50 attached to the module 30 slides in the opening direction of the cut-out section 44 A, and is removed from the fixing section 40 attached to the floor section 10.

Method of Attaching Module 30 to Side Section

Figure 4:
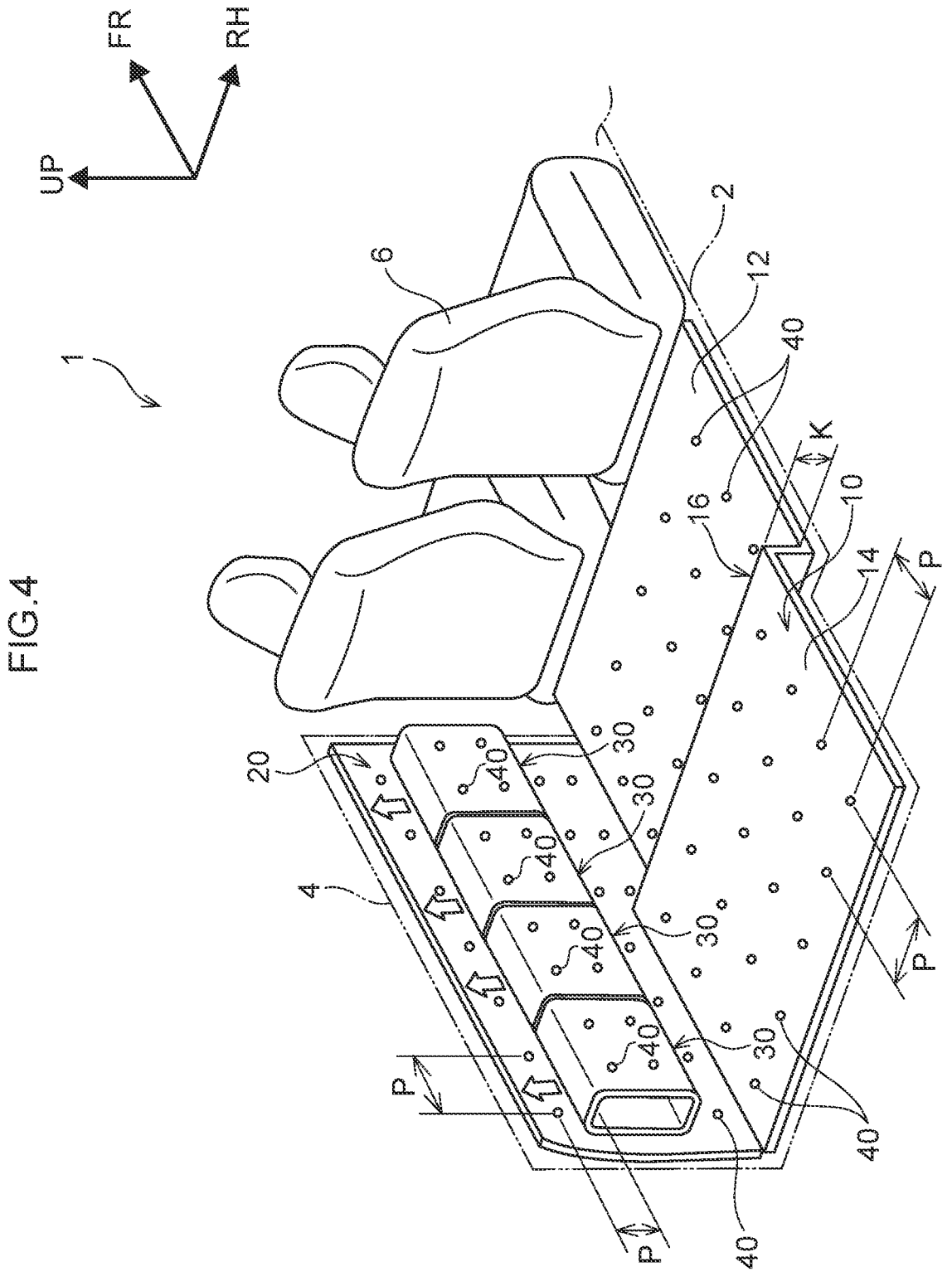
FIG. 4 is a perspective view illustrating an example of a vehicle interior structure according to the present exemplary embodiment, as viewed obliquely from rearward of the vehicle.

As illustrated in FIG. 4, when attaching the module 30 to the side section 20, the module 30 is moved leftward from the vehicle right side of the side section 20 and attached to the side section 20. At this time, the fixing section 50 attached to the module 30 is fixed to the fixing section 40 attached to the side section 20.

Method of Detaching Module 30 from Side Section

When the module 30 is detached from the side section 20, the module 30 is moved toward the vehicle upper side and detached from the side section 20. At this time, the fixing section 50 attached to the module 30 is slid in the opening direction of the cut-out section 44A and removed from the fixing section 40 attached to the side section 20.

Example of Module Arrangement

As illustrated in FIG. 3, the module 30 may be attached to the first floor section 12. In this case, since the height H of the module 30 is set equal to the height K of the step section 16, the upper surface of the module 30 attached to the first floor section 12 is flush with the upper surface of the second floor section 14.

As illustrated in FIG. 4, the modules 30 can be attached to the side section 20 in a posture in which the openings are oriented in the vehicle front-rear direction, and the modules 30 are aligned in the vehicle front-rear direction.

Figure 5:
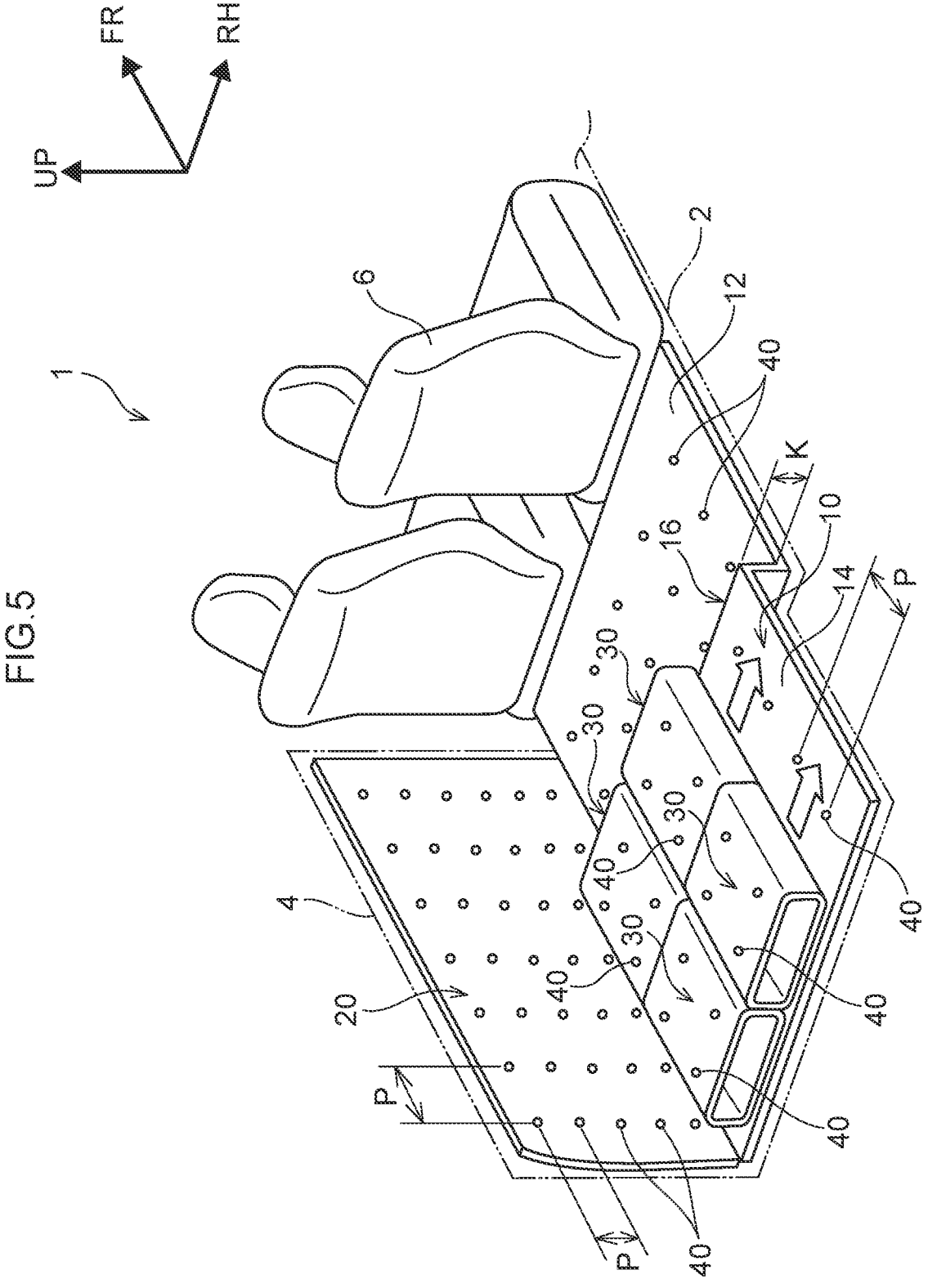
FIG. 5 is a perspective view illustrating an example of a vehicle interior structure according to the present exemplary embodiment, as viewed obliquely from rearward of the vehicle.

As illustrated in FIG. 5, the modules 30 can be attached to the second floor section 14 in a posture in which the openings are oriented in the vehicle front-rear direction, and the modules 30 are aligned in the vehicle front-rear direction.

Figure 6:
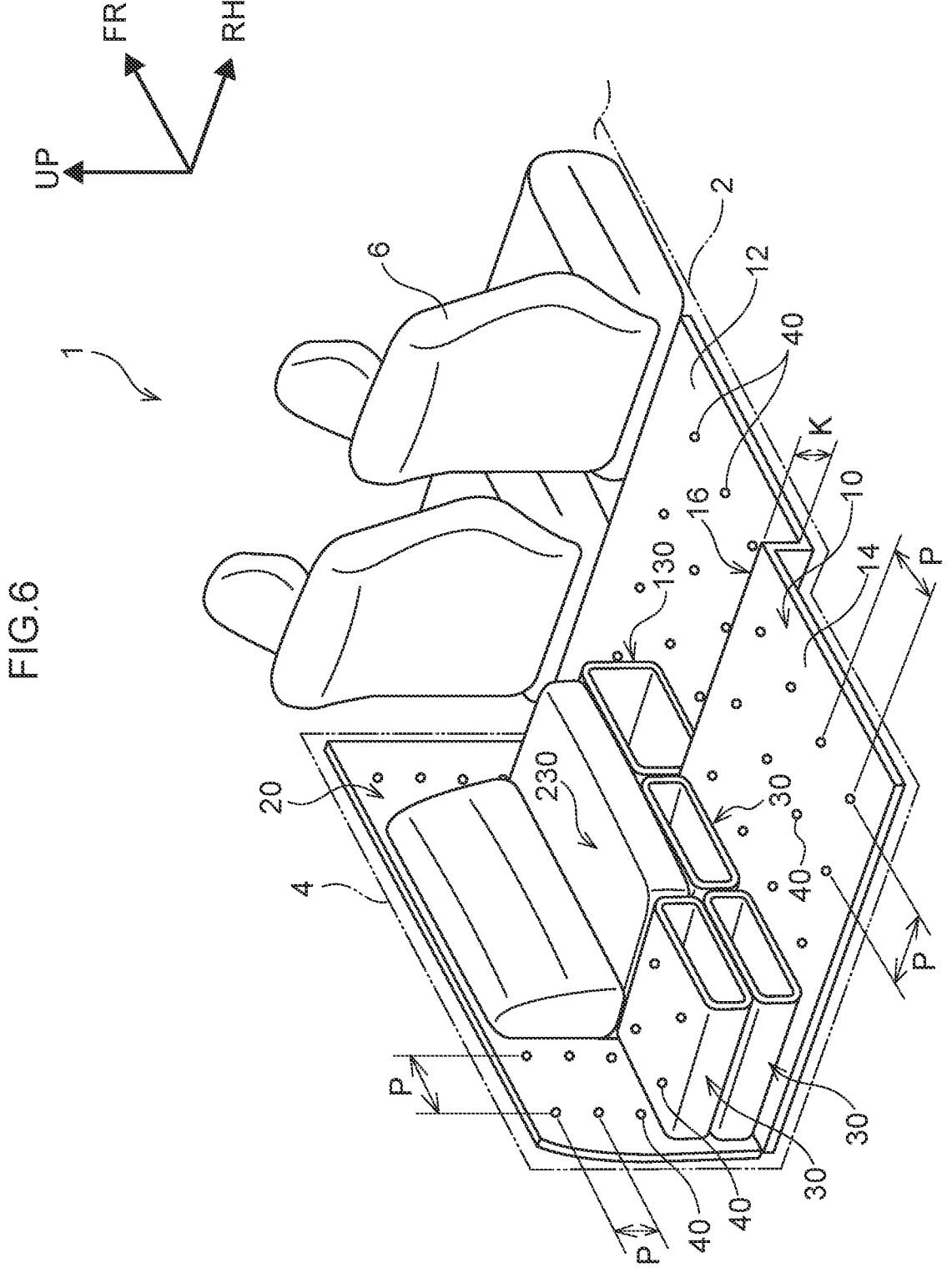
FIG. 6 is a perspective view illustrating an example of a vehicle interior structure according to the present exemplary embodiment, as viewed obliquely from rearward of the vehicle.

As illustrated in FIG. 6, another module 30 can be attached to a module 30 attached to the floor section 10. At this time, the fixing section 50 of another module 30 is fixed to the fixing section 40 of the module 30 attached to the floor section 10.

Note that modules 130 of a larger size than the modules 30 can be used in combination and attached to the floor section 10. Alternatively, a sofa may be configured as a module 230.

Mechanism of Present Exemplary Embodiment

Next, explanation follows regarding the mechanism and advantageous effects of the present exemplary embodiment.

The vehicle interior structure of the present exemplary embodiment includes fixing sections 40 provided at a fixed interval on a floor section 10 extending in the vehicle front-rear direction of the vehicle cabin, and a module 30 that is attachable to and detachable from the fixing sections 40, the direction of detachment being a direction orthogonal to the vehicle front-rear direction and is in-plane with the floor section 10 (refer to FIG. 1).

By providing a module 30 that is attachable to and detachable from the fixing sections 40 provided on the floor section 10 inside the vehicle cabin, the module 30 can be attached to and detached from the vehicle cabin without using tools. This enables the module 30 to be easily attached to and detached from the vehicle cabin.

Moreover, by setting the removal direction of the modules 30 as a direction orthogonal to the vehicle front-rear direction and also as an in-plane direction of the floor section 10, the removal direction of the modules 30 is a direction orthogonal to the vehicle front-rear direction. Accordingly, the removal direction of the module 30 is a direction orthogonal to the direction in which an inertial force acts on the module 30 during travel of the vehicle. The removal direction of the module 30 is also orthogonal to the take-out direction of packages disposed in the module 30. As a result, positional deviation of the module 30 with respect to the vehicle can be suppressed during travel of the vehicle and during loading of packages.

In the vehicle interior structure of the present exemplary embodiment, the floor section 10 includes a step section 16 formed by a first floor section 12 and a second floor section 14 formed at a higher position than the first floor section 12, and at least one module 30 is configured with the same height as the step section 16 (refer to FIG. 3).

By configuring at least one module 30 with the same height as the step section 16, when the module 30 is installed on the first floor section 12, the upper surface of the module 30 is at the same height as the second floor section 14. This enables the module 30 and the second floor section 14 to form a flat surface.

In the vehicle interior structure of the present exemplary embodiment, the module 30 is formed in a tubular shape with both ends opened (see FIG. 5).

The module 30 is formed in a tubular shape with both sides opened, so that when the modules 30 are installed in a row in the vehicle front-rear direction so as to link the openings, a tunnel extending in the vehicle front-rear direction is formed. This enables packages to be placed on the upper surface of the modules 30 and also enables elongated packages to be stored in the tunnel.

In the vehicle interior structure of the present exemplary embodiment, the module includes the fixing section 50 formed on the bottom plate 32 and the fixing section 40 formed on the top plate 34 (see FIG. 6).

Owing to the fixing section 50 being formed on the bottom plate 32 and the fixing section 40 being formed on the top plate 34 of the module 30, the fixing section 50 of another module 30 can be attached to the fixing section 40 of the top plate 34 of the module 30. This enables the modules 30 to be installed in a stacked configuration. As a result, plural modules 30 can be combined in a free layout.

The vehicle interior structure of the present disclosure has been explained above based on the above-described exemplary embodiments. However, specific configurations are not limited to these exemplary embodiments, and changes in design and the like may be permitted unless departing from the spirit of the respective claims.

In the above exemplary embodiments, examples in which the modules 30, 130 are rectangular tubular shapes have been described. However, the modules are not limited to this aspect.

In the above exemplary embodiments, examples in which the fixing sections 40 are provided in the modules 30, 130 have been described. However, the module does not have to include these fixing sections.

In the above exemplary embodiment, an example has been described in which the removal direction of the module 30 attached to the floor section 10 is toward the right of the vehicle. However, the removal direction of the module attached to the floor section may be to the left of the vehicle.

In the above exemplary embodiment, an example has been described in which the removal direction of the module 30 attached to the side section 20 is the vehicle upper side. However, the removal direction of the modules attached to the side sections may be the vehicle lower side.

In the above exemplary embodiments, an example has been described in which the fastener 60 includes the fixing section 50 and the fixing section 40 with respect to which the fixing section 50 is attachable and detachable. However, the fastener is not limited to this aspect.

In the above exemplary embodiment, an example in which the floor section 10 includes the step section 16 has been described. However, the floor section need not have a step section.

In the above exemplary embodiments, examples in which the modules 30, 130 are provided with four fixing sections 50 have been described. However, the number of fixing sections provided in the module is not limited to this aspect.

In the above exemplary embodiments, an example in which the vehicle interior structure is applied to a wagon type vehicle has been described. However, the vehicle interior structure may be applied to other types of vehicles.

What is claimed is:

1. A vehicle interior structure, comprising:
   a first fixing part provided, at a fixed interval, at at least one of a side part extending in a vehicle front-rear direction of a vehicle cabin or a floor part extending in the vehicle front-rear direction of the vehicle cabin; and
   a module that is attachable and detachable relative to the first fixing part, the module having a removal direction that is orthogonal to the vehicle front-rear direction, and in-plane with the floor part or the side part, wherein the floor part comprises a step part formed by a first floor part and a second floor part formed at a higher position than the first floor part, and
   wherein the module is configured to have a same height as the step part.

2. The vehicle interior structure recited in claim 1, wherein the module is formed in a tubular shape that is open at both ends.

3. The vehicle interior structure recited in claim 1, wherein:
   the module comprises a second fixing part, which is configured to be fixed to the first fixing part provided at the at least one of the side part or the floor part and which is formed at a bottom plate of the module, and
   a third fixing part, which is formed at a top plate of the module and which is substantially the same as the first fixing part.

4. A vehicle interior structure, comprising:
   a first fixing part provided, at a fixed interval, at at least one of a side part extending in a vehicle front-rear direction of a vehicle cabin or a floor part extending in the vehicle front-rear direction of the vehicle cabin; and
   a module that is attachable and detachable relative to the first fixing part, the module having a removal direction that is orthogonal to the vehicle front-rear direction, and in-plane with the floor part or the side part,
   wherein the module comprises a second fixing part, which is configured to be fixed to the first fixing part provided at the at least one of the side part or the floor part and which is formed at a bottom plate of the module, and
   wherein a third fixing part, which is formed at a top plate of the module and which is substantially the same as the first fixing part.

* * * * *